United States Patent [19]

LaHue

[11] Patent Number: 4,936,330
[45] Date of Patent: Jun. 26, 1990

[54] PORTABLE VEHICLE WASHING DEVICE

[76] Inventor: Clara LaHue, Route 1, Box 443, Keeseville, N.Y. 12994

[21] Appl. No.: 412,348

[22] Filed: Sep. 26, 1989

[51] Int. Cl.$^5$ .............................................. B60S 3/04
[52] U.S. Cl. ..................................... 134/93; 134/123; 239/276; 239/281
[58] Field of Search ................. 134/57 R, 93, 100, 45, 134/123; 239/276, 281

[56] References Cited

U.S. PATENT DOCUMENTS

| | | | |
|---|---|---|---|
| 2,665,171 | 1/1954 | Stievater | 239/280 |
| 2,965,305 | 12/1960 | Glazer et al. | 134/123 X |
| 3,079,935 | 3/1963 | Padek | 134/45 |
| 3,139,096 | 6/1964 | Harris | 134/123 X |
| 3,401,707 | 9/1968 | Horwitz | 134/123 X |

Primary Examiner—Philip R. Coe
Attorney, Agent, or Firm—Terry M. Geinstein

[57] ABSTRACT

A portable vehicle washing device is used to spray liquid, such as water or a water/soap mixture onto a vehicle, such as a car, during a washing process. The device can be adjusted in several planes to accommodate various vehicles and is used with a garden hose to keep the vehicle wet during the washing process. A telescoping length-expanding joint and an accordion orientation-changing joint are included in a sprinkler pipe and the device includes bumper-attaching hooks as well as ground-engaging supports and rests that engage the top of the vehicle so that the device is securely mounted in place during the washing process.

6 Claims, 3 Drawing Sheets

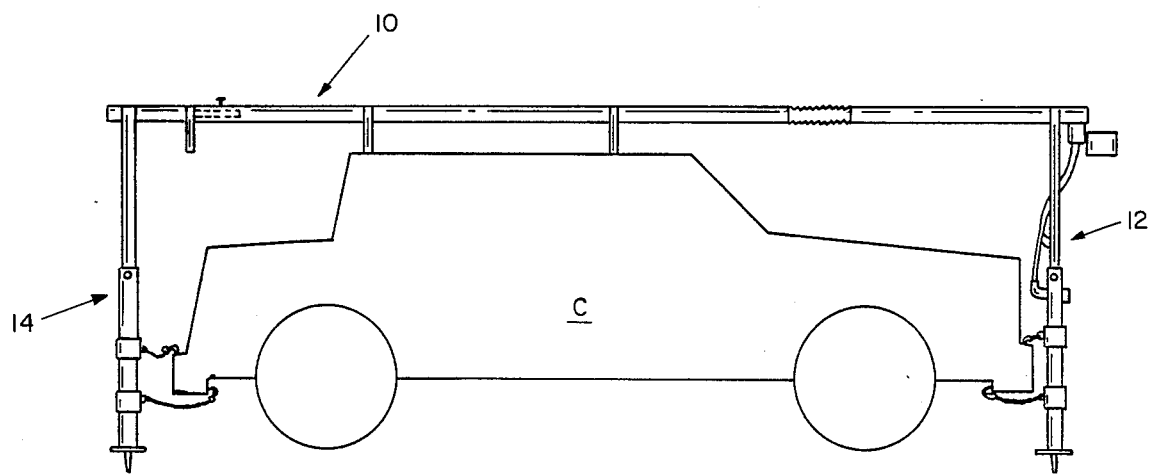
FIG. 1
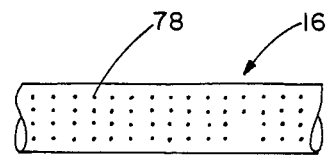
FIG. 6
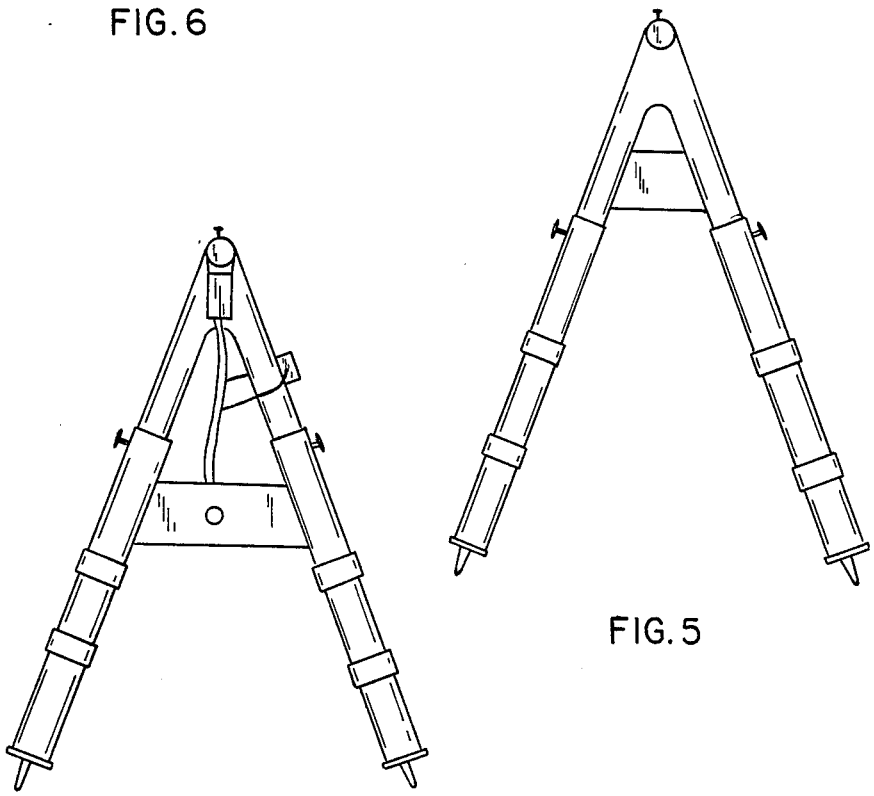
FIG. 4
FIG. 5

PORTABLE VEHICLE WASHING DEVICE

TECHNICAL FIELD OF THE INVENTION

The present invention relates to the general art of land vehicles, and to the particular field of devices for washing such land vehicles.

BACKGROUND OF THE INVENTION

The advantages of keeping a motor vehicle, such as an automobile, clean are well documented. Surface dirt can mar the finish of an otherwise new car. For this reason many people are quite scrupulous in keeping their car clean.

Accordingly, the art contains many designs for car washes. Most often, these car washes are of the fully automated type in which an attendant sets the system for the type of vehicle and the type of wash and treatment to be carried out. There are some car washing systems in which the customer can select his own process. Many of these devices are complicated and expensive, and may require complicated sensors, systems and the like to operate.

While successful and well accepted, these known car washing systems have a drawback in that the vehicle owner must bring his vehicle to the car wash, and then wait in line for his vehicle to be treated. Many people simply choose not to have their car washed rather than put up with such inconveniences.

An alternative to having a car washed in such an automated environment is to simply wash the car at home, and many people opt for this approach.

However, washing a car at home, while overcoming the above-stated problems associated with the automated car wash systems, presents some problems of its own.

For example, many vehicles are incompletely washed due to the inconvenience of applying soap while the vehicle is still wet, or of washing the vehicle and keeping it wet enough for proper washing. Still further, it can be inefficient to keep the car properly wet while carrying out a proper washing process. This may require that the washing process be stopped while a wetting process is carried out, and vice versa. This can be inefficient, and may result in the soap and water being applied in improper amounts and at improper times.

If the car is washed at home, the vehicle is often wet with a garden hose, which can be inefficient in the ways discussed above, and can be wasteful of water if the hose is left on while the other steps in the process are carried out.

While the automated car washing systems can be modified to accommodate vehicles of varying size and shape, this modification comes at the expense of complication in the system. The same is true for the use of water in such systems; that is, the water usage can be varied to fit the particular situation, but only because the overall system includes complicated control circuitry.

Therefore, there is a need for a system that permits a car to be washed at home, but with results that are similar to those that can be obtained using an automated car washing apparatus.

Even further to the above, there is a need for such a home car washing system that permits the efficient use of water and the efficient carrying out of the car washing process, but without undue complications and expenses.

OBJECTS OF THE INVENTION

It is a main object of the present invention to provide a car wash system that permits a car to be washed at home, but with results that are similar to those that can be obtained using an automated car washing apparatus.

It is another object of the present invention to provide a car wash system that permits a car to be washed at home, but with results that are similar to those that can be obtained using an automated car washing apparatus, but which can be easily modified to accommodate different vehicles and water usage without undue complications or expense.

It is another object of the present invention to provide a car wash system that permits a car to be washed at home, but with results that are similar to those that can be obtained using an automated car washing apparatus, but which can be easily modified to accommodate different vehicles and water usage without undue complications or expense and can be used to make the most efficient use of water and soap.

SUMMARY OF THE INVENTION

These, and other, objects are achieved by a hose car washing system that can be modified to accommodate varying sizes and shapes of vehicle, and can be controlled to make efficient use of water and soap.

The system includes support legs and a sprinkler element that are adjustable whereby various vehicles can be accommodated by an easy and quick modification of the system. The system further includes a simple fluid handling system that connects to a garden hose and which can be controlled to provide water when, and only when, it is necessary to provide an efficient washing operation. The device is very light and thus can be moved about easily, yet is sturdy and secure when set up. Furthermore, the device can be collapsed for storage. Thus, the device can be easily stored in an out of the way location and used as necessary.

DESCRIPTION OF THE DRAWING FIGURES

FIG. 1 is an elevational view of the device embodying the present invention in conjunction with a car.

FIG. 4 is an end elevational view thereof.

FIG. 5 is an end elevational view of the device of the present invention.

FIG. 6 is a plan view of portion of a sprinkler pipe used in the device of the present invention.

DETAILED DESCRIPTION OF THE PREFERRED EMBODIMENT OF THE INVENTION

Figure 2:
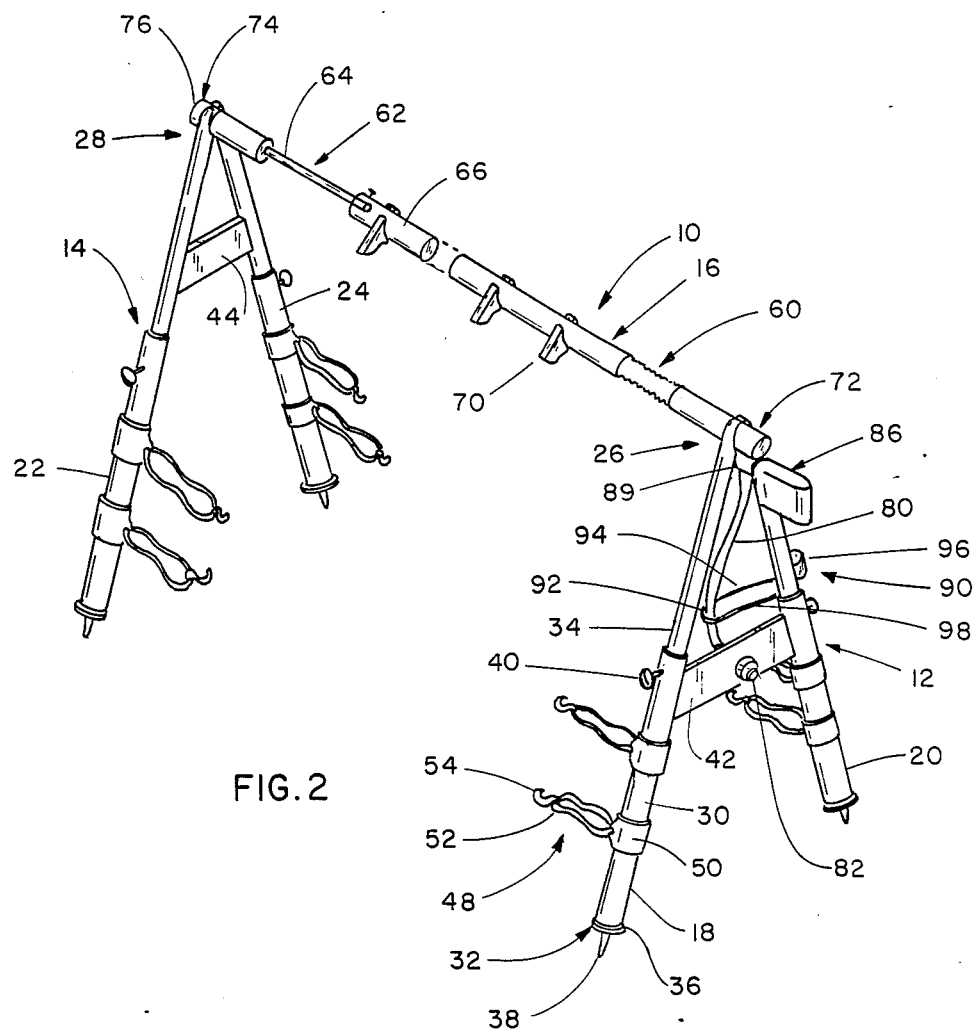
FIG. 2 is a perspective view thereof.
Figure 3:
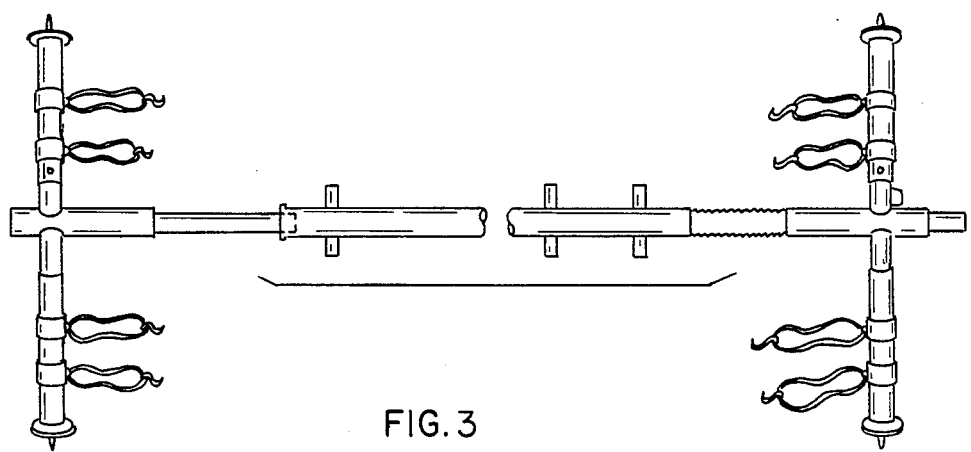
FIG. 3 is a top plan view thereof.

Shown in FIGS. 1 and 2 is a device 10 that is used in the process of washing a vehicle, such as a car C, or the like. It is noted that the device is shown in conjunction with a car, but could be used in conjunction with other vehicles, such is boats or the like, as well.

The device 10 extends lengthwise of the vehicle, and is adapted for use with a garden hose to spray water onto the vehicle in a downward direction as viewed in FIG. 1. The device can be mounted in any selected location on the vehicle, and moved transversely thereof as required to keep a desired amount of water on the vehicle during the washing operation.

As best shown in FIG. 2, the device 10 includes two A-shaped supports 12 and 14, one on each end of a sprinkler pipe 16 to support that pipe in cantilever fashion.

The supports are vertically adjustable, and include telescoping legs 18–24 that are adapted to straddle the long axes of the vehicle and to extend upwards in converging fashion to an apices 26 and 28 on which the sprinkler pipe is supported Each leg includes a sleeve, such as sleeve 30 that has a ground engaging element, such as spike element 32, on the lower end thereof and which telescopingly receives a rod, such as rod 34, in the upper end thereof, as viewed in the set up configuration shown in FIG. 2. The spike elements include flanges, such as flange 36, and elongated spikes 38 extending outwardly from the sleeve to enter the ground and provide a secure support for the legs and thus for the device.

The legs include fasteners, such as wing nut 40, that releasably couple the sleeves to the rods with the rods extending outwardly from the sleeve a selected distance to locate the sprinkler pipe at a height that is selected to be proper for the vehicle being washed using the device 10. The height of the sprinkler pipe can be easily altered and varied using the telescoping feature of the legs.

The legs include crosspieces 42 and 44 to provide a secure feature therefor. Preferably, crosspiece 42 is attached to the sleeve elements of the legs 18 and 20, and the crosspiece 44 is attached to the rod elements of the legs 22 and 24. However, the crosspiece 44 can be mounted on the sleeves of the legs 22 and 24 so that greater variety in height adjustment can be provided.

The legs also include means for attaching the device to the vehicle, and such means are shown in the figures as including bumper attaching elements, such as element 48 which includes a sleeve 50 fixedly mounted on the leg sleeve element and a resilient band 52 mounted on the sleeve 50. The band is preferably an elastomer such as rubber or the like, and has a bumper attaching hook 54 fixed thereon. The attaching elements 48 are connected to the vehicle bumper as shown in FIG. 1 to secure the device in position on the vehicle. The hooks attach on the top and bottom of the bumper as shown.

The sprinkler pipe 16 rests on top of the vehicle being washed, and is adjustable to accommodate a wide variety of different vehicle sizes and shapes. The pipe 16 includes adjustment joints to be adjustable in several planes and to have its length adjustable. Thus, the pipe 16 includes a flexible joint 60 that preferably includes an accordion folded section of the pipe and a telescoping joint 62 that includes a first portion 64 telescopingly received in a second portion 66. The flexible joint permits the pipe to be moved in several planes, and can even be moved to change the length of the pipe, and the telescoping joint can be moved to change the length of the pipe. The pipe includes a fluid-tight seal in the portion 66 around the portion 64, and the portion 64 is hollow so that water and other fluid can flow from the portion 66 to and through the portion 64. The pipe 16 includes several supports, such as support 70, that rest on top of the vehicle being washed to support the pipe in position.

The pipe 16 is hollow and includes a fluid entrance section 72 and an end 74 that is closed by a cap 76 in a fluid tight manner. As best shown in FIG. 6, the pipe includes a multiplicity of exit ports, such as port 78, and fluid, such as water, water/soap mixtures, or the like, flow through the pipe from the entrance end 72 to exit that pipe via the ports 78 and flow onto the vehicle being washed. The joints 60 and 62 also include exit ports, with these ports being defined directly in the accordion folded section 60 and in the portion 64 of the joint 62.

The entrance section is fluidically connected to a source of water by a flexible hose 80 connected at one end thereof to the pipe and at the other end thereof to a coupling 82 mounted on the crosspiece 42 and adapted to receive one end of a garden hose.

A soap container 86 is fluidically connected to the hose 80 to inject soap into the fluid flowing into the pipe 16 via the hose 80 so that a mixture of water and soap can be placed on the vehicle being washed if so desired. The method and means of mixing the soap with the water in hose 80 are well known to those skilled in the art, and thus will not be further discussed beyond stating that systems such as used to mix liquid fertilizer into a sprinkler system for application to lawns or the like are suitable for use in mixing soap from container 86 with water flowing in hose 80. A manually operable diverter valve 89 is included so that the water from the hose ca be diverted into and out of the container as desired by manual operation of the valve 89. If suitable, the valve can be set so that the water flows directly into the pipe and by-passes the container.

A timer system 90 is also included so that the water can be connected to the hose 80, turned on, and left alone while the user washes the vehicle, and will still be intermittently applied to the vehicle rather than continuously applied. The system 90 will turn on and off at selected intervals so that water will flow during certain intervals and be shut off during others. A similar system is found in lawn sprinklers that operate for selected periods and then automatically shut off. For example, the system 90 includes a manually operable diverter valve 92 in the hose 80, a first hose 94 connected to the valve to conduct water away from the valve, a control unit 96 and a return hose 98 to conduct water back from the control unit 96 to the hose. The control unit is set so that after a certain volume of water has passed through that control unit, it shuts off further flow thereby stopping flow to the pipe 16. The control unit includes various controls so that different volumes of water can be selected so that different times of water flow onto the vehicle can be selected. Suitable water flow controlled wheels can be used to measure the volume of water flowing through the control unit and can be connected to suitable shut-off valves via gears, screws and the like to operate such shut off valves after the wheel has turned a predetermined number of times, with the number of times the wheel turns corresponding to the volume of water flowing through the control unit.

If the timer system is not used, the diverter valve 92 is manually set to by pass that system to permit water to flow directly from the inlet 82 to the pipe in an undiverted fashion.

Operation of the device 10 is evident from the foregoing description and thus will not be set forth in detail. The device is set up next to a vehicle, such as car C, positioned into the selected location on the vehicle, adjusted for size and shape by moving the joints 60 and 62, and then set into the ground via the supports 32. A garden hose is fluidically connected to the sprinkler pipe via the connection 82, and the control unit 90 set to the desired time of operation. The soap control unit is also set to inject soap into the fluid flowing into the sprinkler pipe, and the system is started by simply turning on the garden hose. Water, or a water/soap mixture, is sprayed onto the vehicle either continuously or for selected intervals via the ports 78 in the joints and in the pipe without further attention to the device. The user can attend to the washing of the vehicle without attending to the placement of water onto that vehicle.

Figure 7:
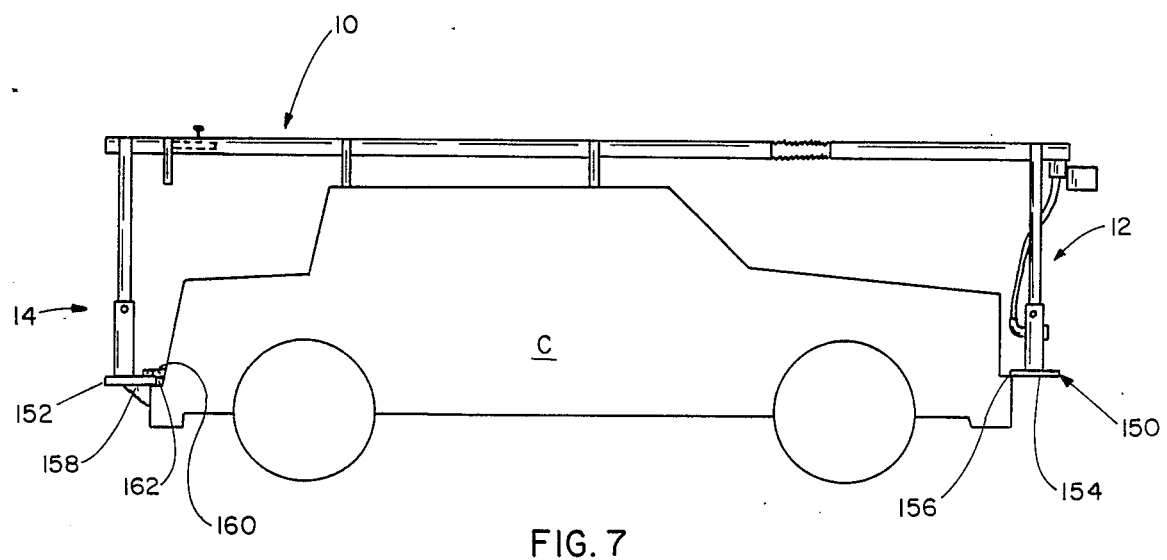
FIG. 7 is an elevational view of an alternative embodiment of the invention.

Shown in FIG. 7 is an alternative device 10' which is mounted on the bumpers of the vehicle to be movable transversely thereof. The device 10' includes elements 12' and 14' which correspond to the elements 12 and 14 discussed above, and which are mounted on a front bumper mount 150 and a rear bumper mount 152 to be movable along those bumpers to wash the entire vehicle. Each of the bumper mounts includs a plate, such as plate 154 mounted on the front bumper by bearings 156. Each of the mounts also includes a lower support bracket, such as bracket 158 that extends for the entire length of the bumper, and a top bracket, such as bracket 160 that also extends for the entire length of the bumper and which is spaced from the lower mounting bracket to define a channel, such as channel 162 in which the mounting plates slide.

Figure 8:
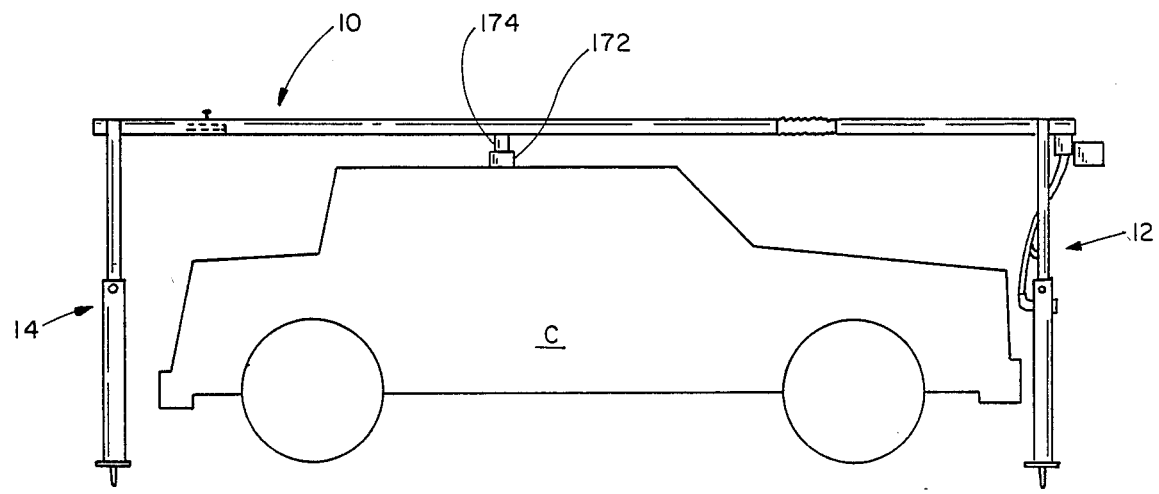
FIG. 8 is an elevational view of another alternative embodiment of the invention.

A device 10" is shown in FIG. 8 and is a further alternative embodiment of the invention. The device 10" is adapted to be mounted on the roof of the vehicle to swivel so that the sides of the vehicle can be sprayed as well. The device 10" thus includes a swivel mount 170 that includes a step bearing and mounting base 172 into which a rod 174 slidably and rotatably received therein and which has a bearing on the end thereof that is located in the base. The bearing on the rod engages a corresponding bearing in the base in a rotatable manner so that the unit 10" is swivable about the base 172. Once the device 10" is located in a selected orientation with respect to the vehicle, the elements 12" and 14" are engaged with the ground and the car washing process is carried out.

It is understood that while certain forms of the present invention have been illustrated and described herein, it is not to be limited to the specific forms or arrangements of parts described and shown.

I claim:

1. A device for use in washing a vehicle, such as a car, comprising:
(A) two A-shaped supports, each support including
    (1) two telescoping legs, each including a tubular sleeve element and a cylindrical rod telescopingly received in said sleeve element.
    (2) a cross piece element connecting said legs together,
    (3) a ground engaging base on each tubular sleeve element and including a spike element, and
    (4) a locking means for locking each rod to a sleeve element;
(B) a sprinkler pipe connected to said rods and extending between said A-shaped supports, said sprinkler pipe including
    (1) a multiplicity of fluid outlet ports defined therein,
    (2) a telescoping expansion joint which includes a rod telescopingly received in an adjacent section of said sprinkler rod, said rod including a plurality of outlet ports,
    (3) an accordion joint, said accordion joint including a plurality of outlet ports,
    (4) an inlet end, and
    (5) a cap on another end of said sprinkler pipe;
(C) a plurality of support elements on said sprinkler pipe for supporting said sprinkler pipe on a vehicle being cleaned;
(D) a fluid supply system connected to said sprinkler pipe inlet end and including
    (1) a hose connection on one of said support cross piece elements for fluidic connection to a garden hose
    (2) a flexible hose fluidically connecting said hose connection to said sprinkler pipe inlet end to conduct fluid from said hose connection to said sprinkler pipe and said outlet ports, and
    (3) a soap injection system fluidically connected to said sprinkler pipe inlet end; and
(e) Vehicle bumper attaching means on said support legs.

2. The device defined in claim 1 in which said telescoping joint includes a fastener.

3. The device defined in claim 1 in said soap injection system includes a manually operable diverter valve.

4. The device defined in claim 3 further including a timing system connected to said flexible hose.

5. The device defined in claim 4 in which said timing system includes a manually operable diverter valve.

6. The device defined in claim 5 wherein said vehicle bumper attaching means include a mounting sleeve attached to a leg, a flexible band attached to said mounting sleeve and hook on said flexible band.

* * * * *